United States Patent [19]

Benko

[11] 4,180,248
[45] Dec. 25, 1979

[54] FLAME CUTTING MACHINE FOR MODIFICATION OF RAILWAY CAR SIDE SILLS

[75] Inventor: John M. Benko, Munster, Ind.

[73] Assignee: Pullman Incorporated, Chicago, Ill.

[21] Appl. No.: 899,428

[22] Filed: Apr. 24, 1978

[51] Int. Cl.² ............................................. B23K 7/02
[52] U.S. Cl. ........................................ 266/67; 266/73; 266/77
[58] Field of Search .................. 266/58, 72, 73, 77, 266/67

[56] References Cited

U.S. PATENT DOCUMENTS

| | | | |
|---|---|---|---|
| 2,515,302 | 7/1950 | Hughey | 266/67 |
| 2,578,778 | 12/1951 | Biach | 266/72 |
| 3,119,009 | 1/1964 | Zeller | 266/73 |
| 3,665,148 | 5/1972 | Yasenchak | 266/58 |
| 3,843,103 | 10/1974 | Sekine et al. | 266/73 |

*Primary Examiner*—John McQuade
*Attorney, Agent, or Firm*—Richard J. Myers

[57] ABSTRACT

An improved flame cutting machine for modifying a railway car by trimming or burning to specific shapes or patterns portions of the longitudinally spaced plate members or gussets which form part of the side sill structure of the car. Adjacent to each side sill is a beam carried by a support structure. The beam supports a cam structure which extends the length of the car. A carriage which rides on the cam structure, supports a torch apparatus mounted on a frame which may be pivoted into position adjacent the gusset to be trimmed.

11 Claims, 7 Drawing Figures

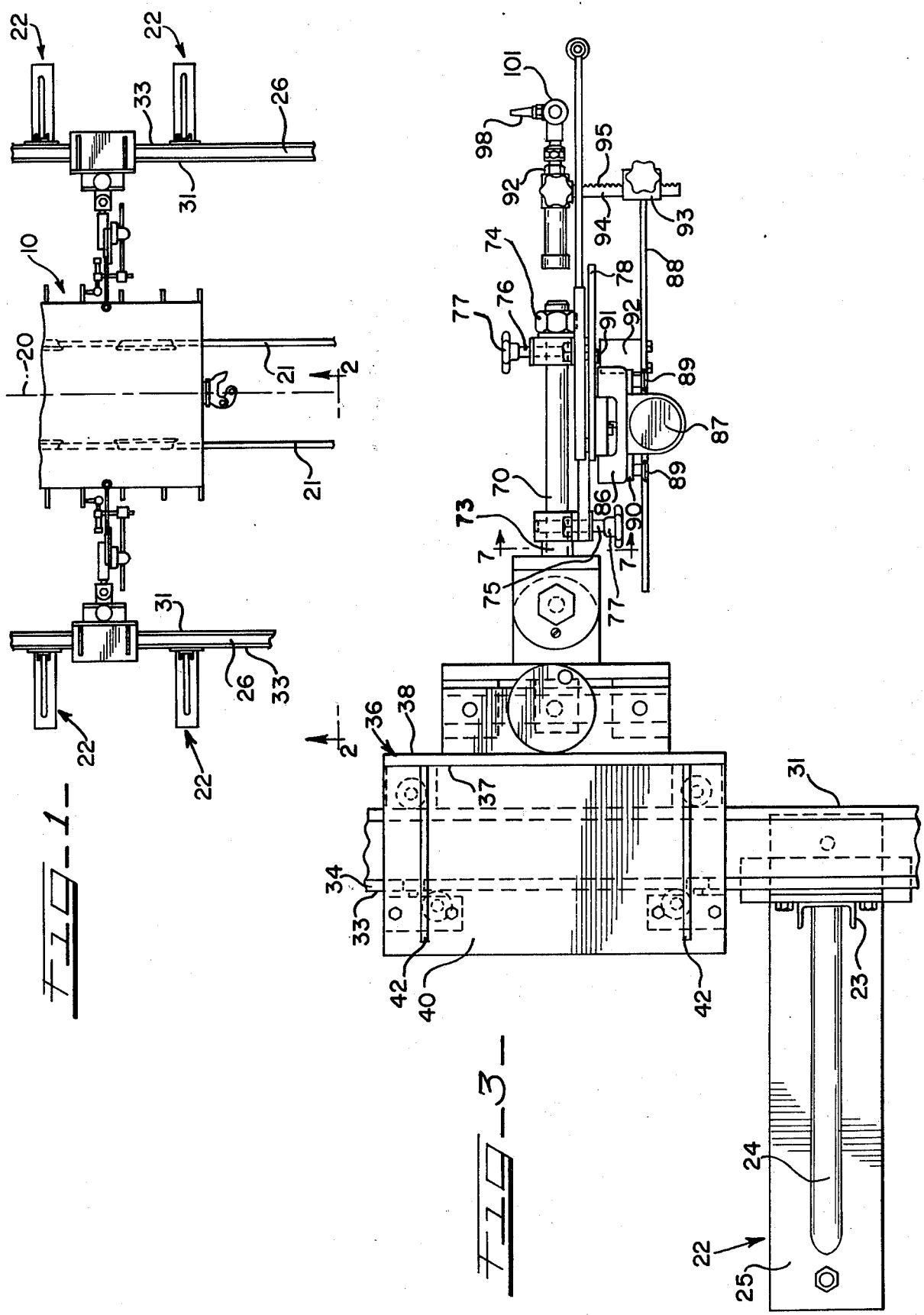

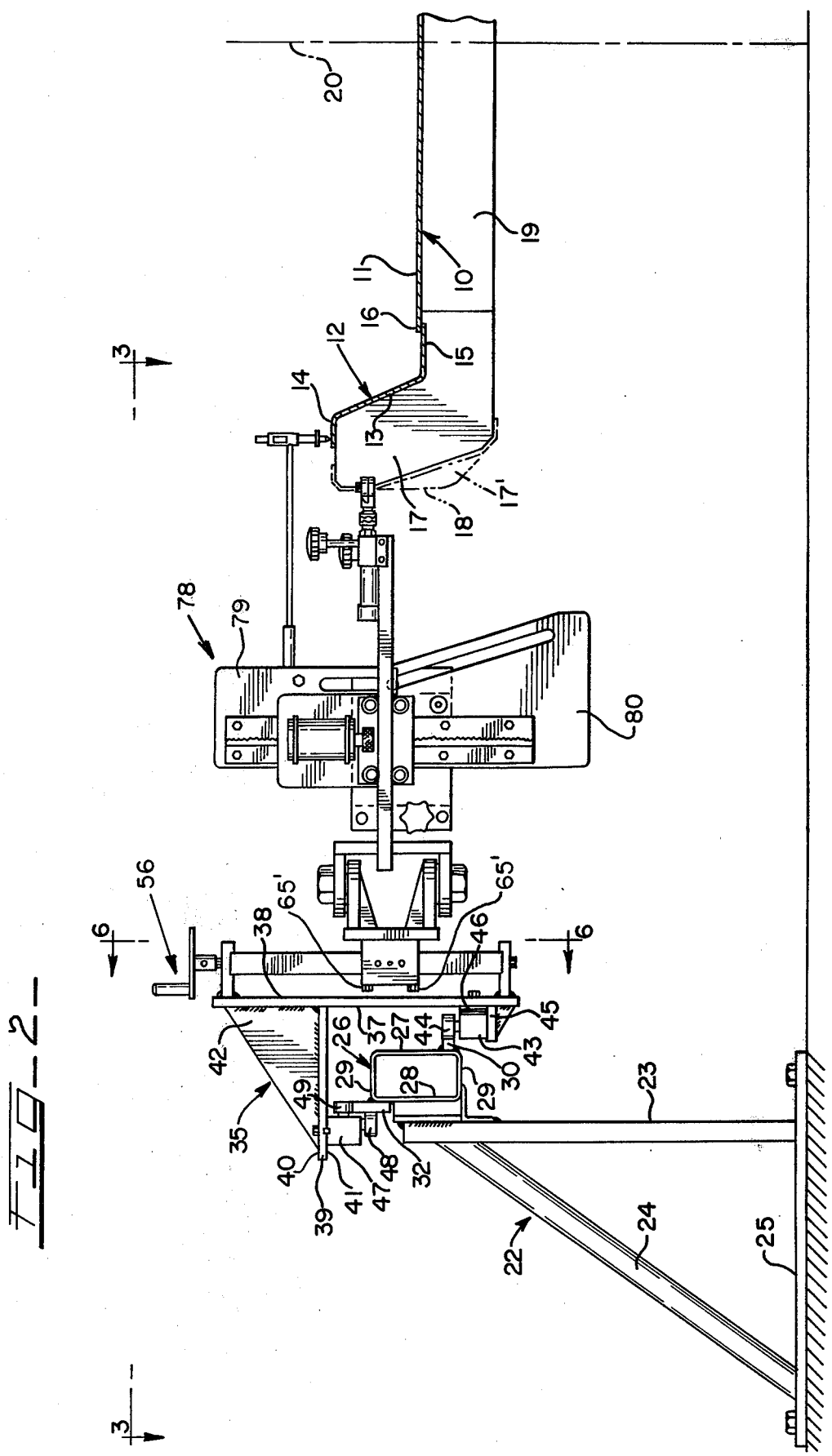

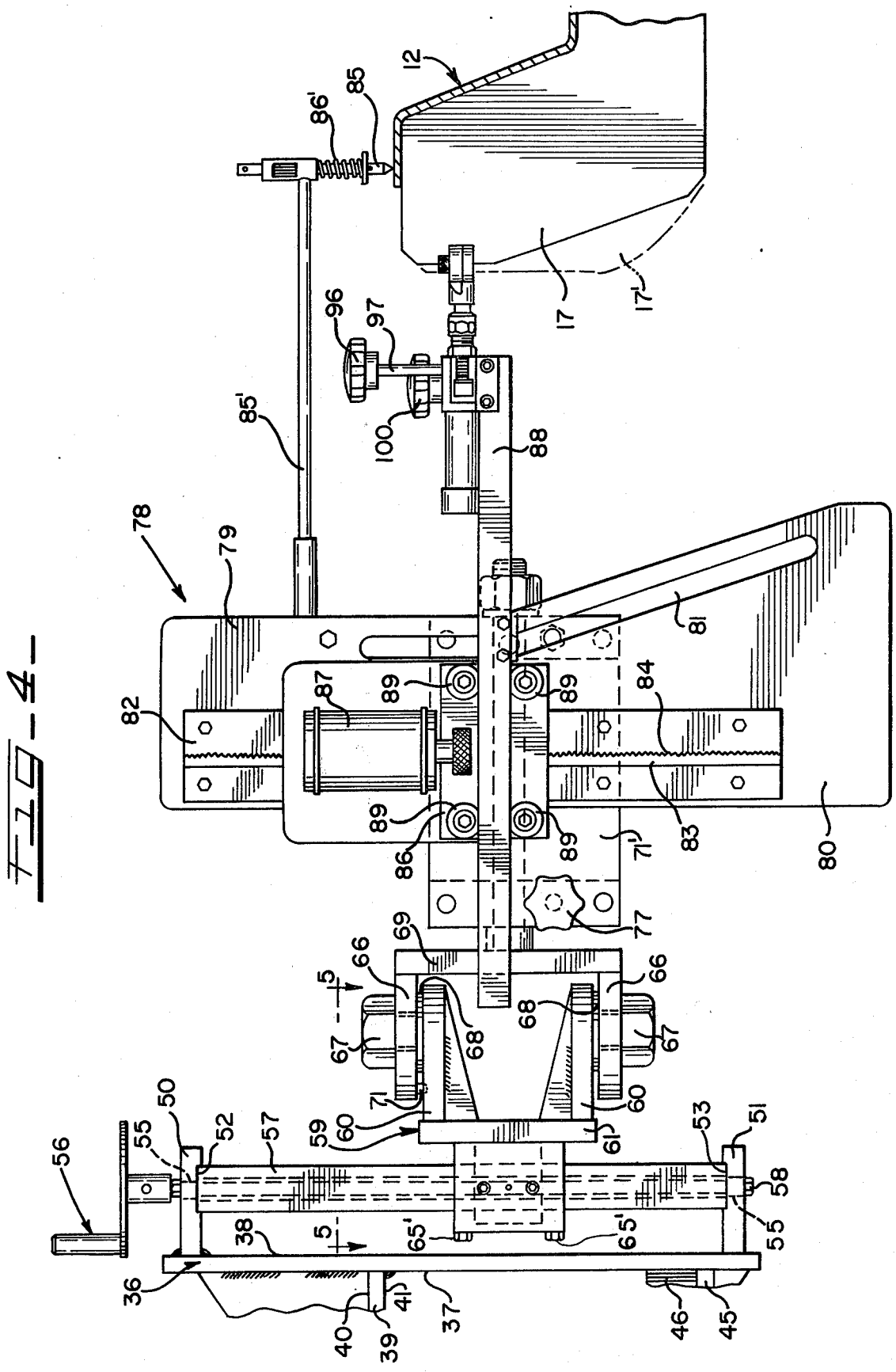

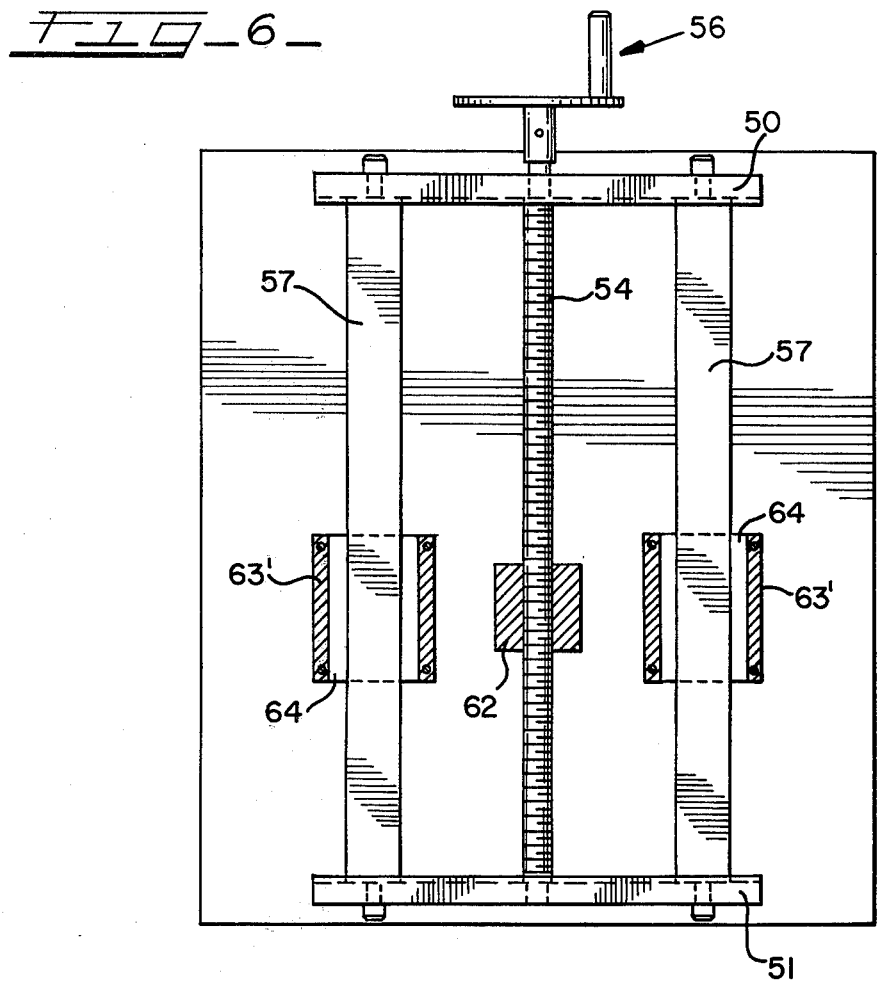
FIG-6-
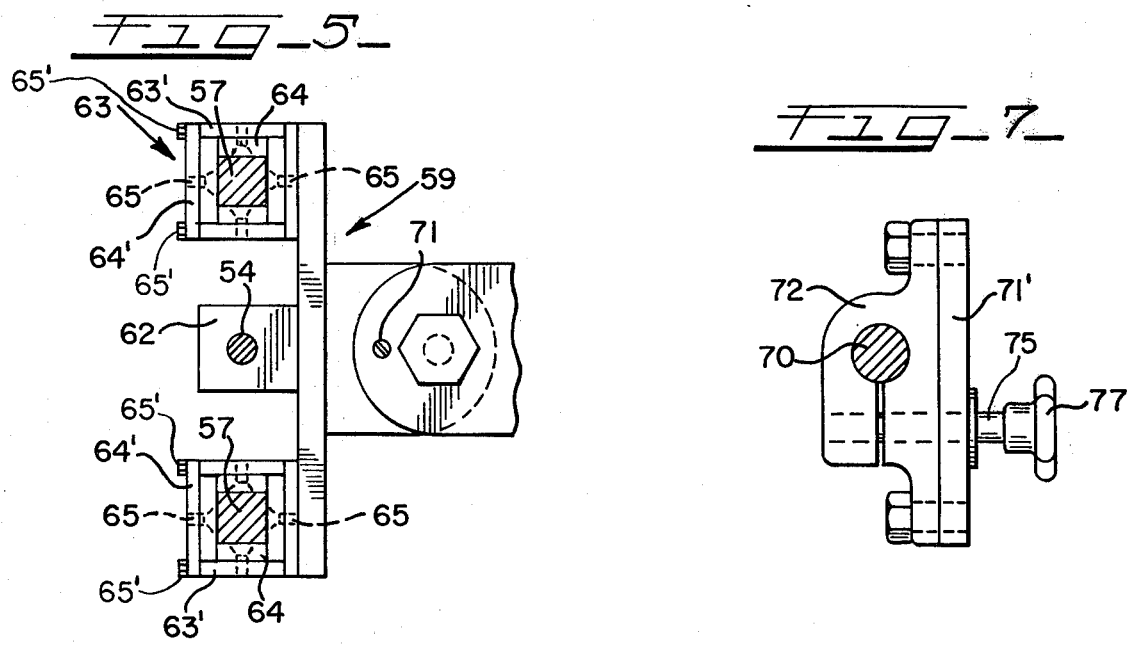
FIG-5-
FIG-7-

FLAME CUTTING MACHINE FOR MODIFICATION OF RAILWAY CAR SIDE SILLS

CROSS REFERENCE TO RELATED APPLICATION

Application Ser. No. 786,753, filed Apr. 11, 1977 now U.S. Pat. No. 4,111,404.

BACKGROUND OF THE INVENTION

1. Field of the Invention

The field of invention relates to a flame cutting machine and specifically to an apparatus which is mounted on a carriage which rides on a beam adjacent to a railway car.

2. Description of the Prior Art

Prior art relating to the present invention includes the following patents: U.S. Pat. Nos. 1,698,173, issued Jan. 8, 1929; 1,867,047, issued July 12, 1932; 2,283,346, issued May 19, 1942; 2,515,302, issued July 13, 1950; 2,568,074, issued Sept. 18, 1951; 3,713,637, issued Jan. 30, 1973; 3,843,103, issued Oct. 22, 1974; 4,003,556, issued Jan. 18, 1977. The present invention is an improvement over the prior art patents.

SUMMARY OF THE INVENTION

The present invention relates to a flame cutting assembly and combination which is particularly adapted for trimming the side sills of a railway car. The arrangement includes a horizontal and longitudinally extending beam which is mounted on a support structure adjacent to each side sill of the car. A pair of cams are mounted on each beam. A carriage, adapted to ride on the cams, is movable the length of the car.

The carriage supports a frame which carries the torch assembly. The carriage includes a power screw arrangement for adjusting the vertical position of the frame. The frame is also pivotable about a vertical axis and about a horizontal axis. This enables the operator to easily move the frame and torch assembly into the proper position adjacent the portion of the side sill to be trimmed. The frame also includes rack and pinion means whereby the cutting torch assembly may be moved vertically and guided by means of a guide slot to trim portions of the gussets in a predetermined pattern.

BRIEF DESCRIPTION OF THE DRAWINGS

FIG. 1 is a top plan view of a railway flat car having its gussets modified by the improved flame cutting machine;

FIG. 2 is a side elevational view taken substantially along line 2—2 of FIG. 1;

FIG. 3 is a top plan view of the flame cutting machine taken substantially along line 3—3 of FIG. 2;

FIG. 4 is an enlarged side elevational view, similar to FIG. 2, showing a portion of the carriage, the frame support member, the frame and torch assembly;

FIG. 5 is a cross-sectional view through the guides taken substantially along line 5—5 of FIG. 4;

FIG. 6 is a view of the vertical adjustment means taken substantially along line 6—6 of FIG. 2;

FIG. 7 is a detail elevational view of the split bearing and plate taken substantially along line 7—7 of FIG. 3.

DESCRIPTION OF THE PREFERRED EMBODIMENT

FIG. 1 is a top plan view of a portion of a railway car body 10 being modified with the improved flame cutting machine. In FIG. 2, one half of the railway car body 10 is disclosed in cross-section; the other half is identical. The body 10 is of the flat-car type and includes a floor 11 having longitudinally extending side sills 12. The side sills 12 are of conventional design and include an inner flange sill plate member 13 having upper and lower flat flanges 14 and 15, respectively. The flanges 15 are suitably connected to the opposite edges of the floor 16. Throughout the length of the side sill members 12 there are provided longitudinally spaced and laterally extending gusset members 17 to which is connected a flanged longitudinally extending side sill plate member 18. The side sill plate member is shown is phantom lines since the plate is removed prior to the gusset trimming operation which the present invention performs. The car body also includes a plurality of longitudinally spaced, transversely extending supports 19 which extend along the car beneath the floor 11. As best shown in FIGS. 1 and 2 the longitudinal center line of the car is indicated at 20.

The present railway flat car 10 is to be modified by the present invention in that the side sills 12 are to be altered by removing portions 17' of the gussets 17 as shown in FIG. 4. Prior to this operation the outer flanged side sill plate 18 is removed.

In some cases, over extended periods of use, the side sills 12 of flat car 10 become bowed to one side or the other. The gusset trimming operation in such a case will result in the edges of the gussets or plate members 17 being in longitudinal alignment. Thus, in effect, the side sills 12 of the car 10 will be straightened in order to facilitate installation of a new outer flanged side sill plate 18.

As best shown in FIG. 1, after the side sill plates 18 are removed, the car riding on rails 21 is moved into position. The flame cutting apparatus is positioned in either side of the car. The apparatus comprises a plurality of supports 22 spaced outside of and adjacent to each of the rails 21. As best shown in FIG. 2, the supports 22 are generally triangle shaped with a first leg 23, a second leg 24 and a base 25 which is fixedly mounted to the floor of the shop.

A horizontal beam 26 which extends the length of the car 10 is positioned on the upper portion of the first leg 23 of each of the supports 22. The beam 26 is rectangular in cross-section having first and second vertical side walls 27 and 28, and upper and lower end-walls 29. A first cam 30 is mounted proximate the lower edge of the first vertical side-wall. The first cam 30 has a vertically extending cam surface 31. A second cam 32 is mounted proximate the upper edge of the second vertical wall 28. The second cam 32 has vertical and horizontal cam surfaces 33 and 34, respectively.

The carriage 35 is adapted to ride on the first and second cams, 30 and 32 respectively. The carriage 35 comprises a vertical plate 36 having a first side 37 and a second side 38. A horizontal plate 39 having an upper surface 40 and a lower surface 41, projects outwardly from the first side 37 of the vertical plate 36. A pair of spaced reinforcing braces 42 extend between the upper portion of the vertical plate 36 and the upper surface 40 of the horizontal plate 39.

A pair of longitudinally spaced first cam followers 43 including rollers 44 are positioned at the lower edge of the first side 37 of the vertical plate 36. The followers 43 rest on platforms 45 which are rigidly mounted to the first side 37 of the vertical plate 36. The lateral positioning of the cam followers 43 is adjustable, for example, through the use of shims 46.

A pair of longitudinally spaced second cam followers 47 including rollers 48 and 49 extend downwardly from the lower surface 41 of the horizontal carriage plate 39. The rollers 48 and 49 engage the cam surfaces 33 and 34 respectively. Thus the carriage 35 is movable longitudinally along the entire length of the car 10.

Mounted on the second surface 38 of the vertical plate 36 are vertical adjustment means. The vertical adjustment means include a pair of upper and lower spaced lugs, 50 and 51, extending outwardly from the second surface of the vertical plate 36. The upper lug 50 has a downwardly facing slot 52 and the lower lug 51 has an upwardly facing slot 53.

Extending between the upper and lower lugs 50 and 51 is a power screw arrangement which includes a threaded shaft 54 suitably mounted on bearings fitted into holes 55 in the lugs. At its upper end the shaft projects through the lug and is connected to a handwheel 56.

A pair of vertical guide posts 57 extend between the upper and lower lugs on either side of the threaded shaft 54. The guide posts are square and adapted to fit into the slots 51, 53 in the upper and lower lugs. Bolts 58 extend through the lugs and into the ends of the guide posts to prevent longitudinal movement in the slots 51, 53.

The power screw arrangement includes a frame support member 59 adapted to move vertically on the threaded shaft 54. The frame support member 59 includes a first clevis with legs 60 extending outwardly from one side of a vertical clevis plate 61. Extending outwardly from and rigidly attached to the other side of the vertical clevis plate 61 is a follower block 62. The follower block 62 has a threaded hole adapted to mesh with the threaded shaft 54 and to move vertically thereon. As best shown in FIG. 5, the frame support member 59 includes a housing 63 having side walls 63' and an end wall 64'. The housing 63 contains the follower block 62, the threaded shaft 54 and the vertical guide posts 57. The housing is attached to the vertical clevis plate 61 by bolts 65'. Bearing liners or pads 64 are attached, for example, with counter-sunk set screws 65, to the first clevis plate 61 and housing 63. The bearing liners or pads 64 preferably consist of a self-lubricating thermo-plastic material. The pads 64 are adapted to abut the corresponding surfaces of the guide posts 57 in sliding relation.

The legs 60 of the first clevis are connected to a second clevis to form a hinge pivotable about a vertical axis. The second clevis includes a pair of legs 66 suitably connected to the legs of the first clevis by hinge bolts 67. Thrust bearings 68 facilitate pivotal movement. Pivotal movement is prevented by stop means 71, such as a spring plunger, which extends through the upper leg 66 of the second clevis. The stop means 71 are selectively engageable in corresponding depressions in the upper leg 60 of the first clevis. The second clevis also includes a plate portion 69 with a shaft 70 projecting horizontally outwardly therefrom.

A plate 71' having a split bearing 72 at each end is rotatably mounted on the shaft 70. The plate 71' is spaced away from the vertical plate of the second clevis by a spacer 73. The shaft 70 is threaded at its free end and the plate is prevented from moving longitudinally on the shaft 70 by a nut 74. The plate can be fixedly held in place by tightening of the bolts 75 and 76. Bolts 75 and 76 are connected to handles 77 to facilitate tightening and loosening.

The plate 71' supports a frame 78 for supporting the flame cutting arrangement. The frame 78 includes an upper portion 79 and a lower portion 80. The frame 78 has a guide slot 81. A vertical track 82 is also provided on the frame 78 and includes a vertical rack 83 having rack teeth 84. A laterally adjustable pointer 85 is mounted from the frame 78 on rod 85'. Spring 86' biases the pointer in position.

As best shown in FIGS. 3 and 4, a torch carrier plate structure 86, driven by motor 87 is guided on the vertical track 82 and moves vertically with respect to the frame 78. A horizontal cam rack 88 is supported by rollers 89 which are mounted on a member 90 which is attached to the plate structure 86. Horizontal movement of the cam rack 88 is achieved by means of a cam follower 91 which is supported on a cam follower support 92 connected to the cam rack 88. As the plate structure 86 moves vertically on the rack 84 the cam follower 91 moves in the slot 81. As the cam follower moves in the slot 91 the cam rack 88 moves horizontally.

A support housing 93 is connected to the end of the cam rack 88. The support housing 93 supports a longitudinally extending rack bar 94 having rack teeth 95. A hand knob 96 is connected to a vertical shaft 97 which is in turn rotatably supported on the housing 93. The shaft 97 is provided at its lower end with a drive gear which is adapted to engage rack teeth 95 whereby the rack 94 may be longitudinally adjusted relative to the cam rack 88.

A torch assembly 98 is adjustably supported on a support or clamp sleeve 99 in turn connected to one end of the rack bar 94. A locking knob 100 is connected to the clamp sleeve 99 and may be tightened or loosened so that the axial position of the torch 98 may be adjusted. The torch 98 includes a rotatable nozzle assembly 101 which also may be used to adjust the relative position of the torch 98 about a vertical axis.

OPERATION

The present invention is particularly adapted for modification of the car body 10. The gussets or plates 17 which are connected to the inner flanged sill member 13 are to be modified by removing material 17' from the main portion of the gussets 17. Initially therefore the outer side sill plate members 18 are removed from both sides of the car body 10.

The car 10 is rolled into position, as shown in FIG. 1, to be modified by the flame cutting apparatus. The new center line 20 of the car 10 is established by scribing or other markings which extend the length of the car 10. It should be noted that the original center line of the car may not coincide with the new center line. Often, after years of service, a car may become bowed laterally to one side or the other, thus causing the original center line to be curved.

The torch is positioned adjacent the gusset 17 to be modified by moving the carriage 35 longitudinally along the cams 30 and 32. The frame 78 is pivoted about a vertical hinge axis formed by the first and second clevises 60 and 66. Thus the entire frame 78 can be selectively pivoted into position and moved out of the way if desired. Proper vertical positioning of the torch 98 is achieved by use of the hand wheel 56 which moves the frame vertically on the threaded shaft 54. The indicator 85, which is movably attached to the frame 78, is placed on a reference line on the side sill which is parallel to the new center line 20.

The frame 78 is placed in alignment with the gusset 17 by lossening knobs 77 and pivoting the frame 78 about the shaft 70. Usually proper alignment occurs with the frame 78 and gusset 17 in the vertical position and with the frame 78 perpendicular to the side of the car 10. However, if the gusset is bent it may be necessary to tilt and pivot the frame 78 accordingly. Longitudinal and axial adjustment of the cutting torch 98 is achieved by turning knob 93 and 100 respectively.

After the frame 78 is properly aligned, the motor 87 drives the torch carrier plate structure 86 and moves along the vertical rack 84. The movement of the torch 98 is guided by virtue of the cam follower 91 moving in slot 81.

By virtue of the present arrangement accurate modification of the side sills is accomplished as the frame and torch assembly are moved longitudinally on the beam from gusset to gusset.

What is claimed is:

1. A flame cutting machine positionable adjacent a railway track for trimming laterally extending plate members on the longitudinally extending side sills of a railway vehicle which support the plate members, comprising:
    a plurality of longitudinally spaced support members positionable adjacent the track;
    a longitudinally extending beam carried by said support members;
    carriage support means on the beam;
    a carriage supportably carried on the carriage support means and movable longitudinally thereon;
    said carriage including adjustment means and a frame support member on the adjustment means;
    a cutting torch frame supported on the frame support member;
    cutting torch means on the frame;
    means guiding said cutting torch means on said frame for flame cutting portions from said plate members; and
    said adjustment means being adapted for selectively vertically positioning said cutting torch frame relative to the side sills of the car.

2. The invention according to claim 1, and
   said frame being hingedly mounted on said frame support member about a first hinge axis and a second hinge axis;
   said first hinge axis being vertical and said second hinge axis being perpendicular to said first hinge axis.

3. The invention according to claim 2, and
   said frame and support member including first and second locking means for selectively locking said frame in a plurality of positions on said first and second hinge axes, respectively.

4. The invention according to claim 3, and
   said frame being mounted proximate its center of gravity on said second hinge axis.

5. The invention according to claim 1, and
   said beam including laterally spaced first and second walls each having upper and lower edges;
   said carriage support means comprising a first cam attached to the first wall proximate said lower edge and a second cam attached to the second wall proximate said upper edge;
   said first cam having a vertical cam surface; and said second cam having a vertical and a horizontal cam surface.

6. The invention according to claim 5, and said carriage comprising:
   a substantially vertically extending plate having first and second sides and a substantially horizontally extending plate having upper and lower surfaces;
   said horizontal plate being attached to and extending outwardly from said second side of the vertical plate;
   said carriage having a pair of longitudinally spaced second cam followers on said lower surface of the horizontal plate;
   each of said second cam followers having a roller adapted to engage the vertical surface and the horizontal surface of said second cam;
   said carriage having a pair of longitudinally spaced first cam followers on the second side of said vertical plate;
   each of said first cam followers having a roller adapted to engage the vertical surface of said first cam.

7. The invention in accordance with claim 6, and
   each of said first cam followers having means for adjusting the lateral position of said first cam followers for aligning said carriage and frame with respect to the side sill of the car.

8. The invention according to claim 1, and said vertical adjustment means comprising:
   a pair of lugs mounted on the carriage and extending outwardly therefrom;
   a vertically extending threaded shaft rotatably supported between the lugs and means on said shaft for rotating the same;
   a guide post on each side of the threaded shaft extending between the lugs;
   said frame support member including a follower block having a threaded portion adapted to move vertically on the threaded shaft;
   said frame support member including a housing slidably embracing each of said guide posts.

9. The invention according to claim 4, and
   said cutting torch means including a torch, and means on said cutting torch means for selectively positioning said torch laterally and longitudinally relative to said plate members.

10. The invention according to claim 9, and
    including a camming and follower means connecting said torch means to said frame.

11. The invention according to claim 10, and
    including motor means on said frame for moving said torch means relative to said plate members.

* * * * *